Patented Apr. 5, 1949

2,466,052

UNITED STATES PATENT OFFICE 2,466,052

PREPARATION OF CLAY CATALYSTS

Hubert A. Shabaker, Media, and George Alexander Mills, Ridley Park, Pa., and Ruth C. Denison, Wilmington, Del., assignors to Houdry Process Corporation, Wilmington, Del., a corporation of Delaware No Drawing. Application July 3, 1946,
Serial No. 681,426

9 Claims. (Cl. 252—450)

1

The present invention relates to the treatment of natural clay substances and is chiefly concerned with the production of adsorptive and catalytic materials from such substances.

In the preparation of certain clays for use as decolorizing adsorbents and in catalysis it is common practice to "activate" the clay by subjecting the same to treatment with mineral acid. Such treatment extracts a large part of the aluminum compounds from the clay and incidentally also removes a portion of the iron and/or other fluxing impurities therefrom. The products obtained as a result of such treatment may be characterized by reasonable catalytic activity and stability on continued service in commercial operation. However, in certain operations their stability is less than desired. They still contain in most instances a residual iron content that is not ordinarily removable by continued or more severe acid treatment without extraction of too large a quantity of the aluminum or impairment otherwise of the physical and other properties of the residue, particularly evidenced by a marked decline in catalytic activity. Although it is not desired to be bound by any scientific explanation, there is reason to believe that the less readily removable iron components of clays are present in a different form from that of the more easily extractable iron components, being intimately associated in a complex with silicon or perhaps forming a part of the lattice structure by addition to or as proxy for other principal cations of the pattern. This form of iron component may be broadly designated as "isomorphous," although it is recognized that the clay structure may not necessarily be crystalline and that portions or all of the more tenaciously held iron components may vary in form from that of the principal component of the clay structure.

In our copending applications 644,421 and 644,422, filed January 30, 1946, of which the present application is in part a continuation, certain methods are described for the treatment of clays effecting improvements in their properties particularly with regard to their use as hydrocarbon cracking catalysts, such treatment comprising contact with reactive gases or vapors at elevated temperatures, preferably in the range of from 1200 F. and upward. Improvement in certain properties of the clay is already effected with hydrogen sulfide as the treating agent at even below 1200° F.

The present invention is based upon the discovery that by treatment of clays in dry form with a vapor or gas comprising carbon disulfide at temperatures of at least 1300° F., especially improved catalytic and absorptive properties are imparted to the clays as hereinafter set forth. These changes are accompanied by conversion of iron compounds in the clay to a form whereby the same can be readily and selectively removed. Such removal may be effected without such accompanying removal of aluminum compounds or other detrimental changes which reduce or destroy the adsorptive qualities of the product or reduce its catalytic activity. The residual mass acquires as a result of the treatment surprisingly new and important properties particularly evidenced when a clay treated in accordance with the invention and prepared as a catalyst is utilized in hydrocarbon conversion, as will appear below.

As a result of the treatment, raw clays having an iron content corresponding to as high as 4.% or more of $Fe_2O_3$ by weight can be reduced generally to about 0.4% $Fe_2O_3$ or lower and with some clays to as low as 0.2 or 0.1% $Fe_2O_3$. The catalytic or absorptive properties of many common clays heretofore regarded as inferior or unsuitable for certain specialized uses named above are so improved that these clays come into consideration as inexpensive and efficient materials for such purposes. Thus, many natural clays previously regarded as inefficient or undesirable as hydrocarbon conversion catalysts are made suitable for such use and otherwise catalytically active or acid activable clays considerably improved in useful properties.

The treatment of the clay in accordance with the present invention effects a transformation to acid soluble salts of that portion of its iron content present in a form not selectively removable by acid treating, whereby it is made available for subsequent removal such as by a mild acid leaching and/or washing or in some instances by volatilization. By the treatment with carbon disulfide at the specified high temperatures, the otherwise not readily available and difficultly removable iron compounds are apparently converted to salts which are quite soluble in acid solutions. In terms of the theory set out above, although it is not desired to be bound thereby, there is reason to believe that the iron present as a silicon complex or otherwise forming a part of the lattice structure as by addition to or proxy for other principal cations of the pattern, is converted by the high temperature $CS_2$ treatment to simpler or more reactive compounds such as sulfides which are soluble in the acid employed in subsequent leaching.

The treatment with carbon disulfide at the high temperature may be preceded by a wet treatment of the clay with mineral acid or an organic acid which forms soluble iron salts or complexes, including lower aliphatic carboxylic acids such as oxalic and acetic as well as hydroxy acids including lactic and the so called sugar acids. Where the acid treatment precedes, the more available iron compounds (f. i., outside the lattice structure) are removed as soluble salts as in the known acid activation of bentonites leaving the residual iron component (f. i., chemically combined in the lattice) to be reacted with the carbon disulfide. Acid leaching following the treatment with the carbon disulfide containing gas or vapor, effects or facilitates the selective removal of products formed by the reaction of the carbon disulfide with the complex or otherwise less available residual iron components. It will be readily understood, therefore, that it may be desirable to employ an acid treatment before as well as after the treatment with the $CS_2$ product. Instead of removing the freed or solubilized iron by acid or other solvent, it is possible to convert the same to vaporizable compounds such as ferric chloride, and remove the same by volatization. Of course, this step, if practiced can also be followed by a subsequent acid washing step.

In the production of a catalyst, in accordance with the preferred embodiment, from a clay of the montmorillonite group or other clay having the characteristics of the bentonites or subbentonites, the initial acid pretreatment is particularly advantageous, since the otherwise poor porosity of the natural or untreated clay impedes penetration by the carbon disulfide. Generally with kaolin type clays acid pretreatment is less significant although with some types of kaolin clays acid pretreatment may also be found beneficial. The acid treatment may be effected by known processes such as are employed in the art for "acid activation" in the manufacture of decolorizing clays. For instance, the acid treatment may be carried out on the clay in finely divided form while the clay is suspended in water as in the nature of a slurry, to which concentrated mineral acid such as hydrochloric or sulfuric is added, or dilute mineral acid may be added directly to the finely divided clay. In either case the ratio of acid to clay is preferably in the order of about 20 to about 40%. The initial acid treatment if practiced, is preferably effected at elevated temperature as from about 160° F. to about the boiling point of the acid or acid-clay mixture, and may be continued for a period of about two to twelve hours; thereafter the treated clay is water washed and filtered. If desired, the clay may at this point be washed free of acid ions with accompanying extraction of soluble metal salts. The acid treated clay with or without purification by washing may then be dried in any known or desired manner. More concentrated or larger proportions of acid may be employed and/or higher temperatures including increased pressures, or longer periods of treatment up to the approximate limit where the combined effect tends to no longer selectively remove iron compounds without undue solution of aluminum compounds. This point cannot always be defined accurately with respect to chemical composition of the acid treated clay, for the optimum point varies with the source of the raw clay. For many if not most raw bentonites, however, this point is reached when the weight ratio of $SiO_2$ to $Al_2O_3$ of the total clay lies in the range of 2.5:1 to 10:1 for example about 4.5:1 and the residual alumina content is in the range of about 25 to 5% for example about 17%. Acid treatments of clay such as for instance are described in U. S. Patents 1,397,113, 1,579,326, 1,642,871 are suitable. The acid pretreatment, of course, may be less severe than is required for activation of the clay and may be sufficient only to open pores in the clay, allowing easy access of the carbon disulfide.

The untreated clay or the above described acid treated clay or a commercially obtainable acid activated clay in dry finely divided form, or after being formed into particulate masses as for instance by granulating, molding, extruding or the like (as is practiced in forming of clay catalysts) is subjected to the treatment with the $CS_2$-containing vapor or gas at a temperature in the range of from about 1300° F. up to about the temperature which would result in rapid shrinkage or substantial incipient fusion of the clay. Since clays will vary in composition and properties including fusion temperature even when obtained from the same source, exact temperature ranges cannot be set out. It has been observed that with montmorillonite types of clay the maximum temperature may be as high as 1500° and at times 1550° F., whereas in the case of kaolin clays, even higher temperatures may be employed as above 1600° to 1650° F. The quantity of $CS_2$ employed should be at least sufficient to chemically combine with the quantity of iron present in the clay but is advantageously employed in excess. Any inert gas or vapor may be employed as a diluent or carrier for the $CS_2$, or if desired other active non-oxidizing gases or vapors advantageously those containing combined sulfur, such as hydrogen sulfide, may be added to the $CS_2$.

The iron compounds such as sulfides formed by the $CS_2$ treatment may be removed by washing the treated clay product as with a solvent for such compounds, or preferably by treating with dilute acid, if desired alternated with water or solvent. The acid or solvent employed should advantageously have a selective action on the iron compounds formed by the $CS_2$ treatment without removing substantial quantities of the aluminum or silicon components of the product. Instead of leaching or wet extracting the freed iron compounds, they may be converted by further treatment with an appropriate reagent to a vaporizable compound, such as ferric chloride which is removed by vaporization. In some instances and with some clays it will be found advantageous to subject the clay to intermediate oxidizing conditions following the treatment with $CS_2$, which may be accomplished by subjecting the clay to hot air at a temperature of 800–1000° F. or less. In this manner the subsequent leaching by acid or solvent may be facilitated.

To obtain the beneficial advantages of the present invention it is essential that the treatment with carbon disulfide be carried out at temperatures of about 1300° F. or higher, since at lower temperatures the tenaciously bound isomorphous iron compounds are not sufficiently released and the resulting products do not possess the described important properties of catalysts prepared in accordance with the present invention. The desired modification of the clay and transformation of the iron by the $CS_2$ can be effected in short time as of the order of several minutes, far less than an hour being usually required even at the lower temperatures of the described range.

Depending upon the use to which the clay is to be put, the preliminary acid treatment and/or the $CS_2$ treatment may be carried out with the clay in finely divided form or as preformed aggregates of larger size which may be broken pieces of filter cake or more regular and uniform shapes. In the latter case, the larger aggregates are advantageously formed previous to subjecting the clay to $CS_2$ treatment, but preferably immediately subsequent to the preliminary acid treatment, if practiced. These larger masses may be formed for instance by compressing the dry finely divided particles or powders as in a pelleting machine or by previously wetting the dry, treated or untreated, clay with water or other inert liquid that will bind the small particles or powder into a cake which, after drying, can be broken up into granules or fragments of desired sizes or the wet mix can be formed into more regular shapes by molding including casting, extruding or the like. In instances where the described high temperature $CS_2$ treatment is carried out on powder or fine particles, the cohesive properties of the clay may be affected, in which case it may be necessary to add a suitable binder or lubricant to assist in the forming operation, care being taken in selecting such ingredient and maintaining the addition at a minimum so as not to interfere with the catalytic activity of the formed mass, as for instance one can use a raw or acid activated clay of good cohesive properties as a binder for the treated clay. If the clay product is to be employed as catalyst or otherwise in the form of fine particles or powders, the formation of larger aggregates such as granules, tablets or pellets for treatment with $CS_2$ is of course not necessary, but if desired, such larger masses can be formed and treated in accordance with the above-described procedure and subsequently ground or comminuted to the required fineness.

For catalytic use it will be found advantageous as a final step in the preparation of the contact mass from clay to subject the same to calcination at a temperature above 800° F. in air with or without added steam or steam alone.

As a result of the improvement obtained by the described process of the invention, the choice of raw clays for many industrial uses is materially extended. Thus, it is made possible in accordance with the present invention not only to obtain improved catalysts from hitherto employed active clays such as montmorillonites including acid-activated bentonites and the like, but by the herein disclosed novel processes, clays such as those of the kaolin type which could not be brought to acceptable levels of catalytic activity by prior art methods, now become available for practical use as hydrocarbon conversion catalysts.

For use of the contact masses prepared by the present invention as catalysts in hydrocarbon conversion processes no change in conditions of treatment of the hydrocarbon to be processed is rendered necessary. The usual conditions as to time, temperature, etc. can be followed if desired. As an example of a fixed or stationary catalyst bed operation, cracking may be carried out at a temperature of 800° F. to 900° F., employing a space rate (volume of charge, liquid basis, per volume of catalyst per hour) of about 1.5, and a pressure of about 15 pounds per square inch gauge. The temperature, of course, may be varied within the range of about 700° F. to 1100° F., the space rate within the range of about 0.5 to about 8, and pressures may be employed from about atmospheric or slightly lower up to about 100 pounds per square inch, or even higher. Under these conditions the operating period "on stream" may range from five to sixty minutes, for example 10 to 30 minutes alternating with regeneration periods.

In processes other than those where the catalyst remains in a stationary or fixed bed, such as where the catalyst moves through the reaction zone, the conditions employed may be such, as to subject the oil to substantially equivalent conditions including contact time and ratios of oil to catalyst as those set out above in connection with the fixed bed process. The catalyst during its cycle is passed through a separate regeneration zone.

Reforming may be carried out in accordance with the invention by charging a virgin or cracked gasoline or naphtha fraction under conditions similar to those employed in cracking. In all of these processes, the catalyst after use is regenerated by contacting it with air or other oxygen-containing gas to burn off carbonaceous deposits.

In the following examples, notations of catalytic activity are expressed in terms of the standard test (CAT-A method) described in "Laboratory method for determining the activity of cracking catalysts" by J. Alexander and H. G. Shimp, page R-537, National Petroleum News, Technical Section, August 2, 1944. In accordance with the method, a light gas oil is contacted with the catalyst under fixed cracking conditions and the activity of the catalyst is designated in terms of volume per cent of obtained gasoline; the weight per cent of wet gas, specific gravity of the gas, and weight per cent of carbonaceous deposit are also determined.

*Example I*

The raw clay treated in the several preparations of this example was a kaolin, obtained from a deposit on the Eccles property in Putnam County, Florida, having the following composition on an ignited basis (containing 10-20% sand):

| | Parts by weight |
|---|---|
| $SiO_2$ | 65.8 |
| $Al_2O_3$ | 32.4 |
| $Fe_2O_3$ | 1.4 |
| $CaO$ | 0.23 |
| $MgO$ | 0.21 |
| $TiO_2$ | 0.69 |

(a) The clay was worked in water to obtain a plastic mix suitable for extrusion and extruded to form 4 mm. cylindrical pellets which were dried in an oven over a temperature range of 130° F. to 240° F. for three hours.

(b) Dry pellets from (a) were heated to 1400° F. in an electric furnace and treated at this temperature for two hours with a flowing stream of nitrogen to which carbon disulfide was added continuously until the total $CS_2$ employed was equal to about 9.0 per cent of the weight of the pellets, (being in stoichiometric excess of the iron content). The nitrogen gas flow was then continued for about 2 hours longer, heating being stopped, then the flow of gas discontinued and the pellets permitted to cool to room temperature and discharged.

(c) The cooled pellets from (b) were then treated with an equal volume of 15% hydrochloric acid solution (15 parts by weight HCl to 85 parts $H_2O$) and permitted to stand for four hours, after which the acid was decanted and replaced by an equal volume of fresh 15% hydrochloric acid solution. The pellets and acid solution were permitted to stand in contact for an additional 20 hours with occasional agitation, after which the acid was discharged. The pellets were washed with water until the wash water tested free of chlorides, then dried in an oven at about 200° F. The dried pellets were finally calcined in air at 1050° F. for 2 hours.

(d) Another portion of the pellets from (a) above were contacted with $CS_2$ in nitrogen at 1300° F. (about twice the previous quantity of $CS_2$ being employed) then further treated in the same manner as the 1400° F. pellets in (b) and (c) above.

(e) For comparison, similar treatments with $CS_2$ were conducted on like pellets at lower temperatures as will appear in the tabulation below. The pellets obtained in each instance were analyzed for iron content with the following results:

| $CS_2$ treat temperature | 1400° F. | 1300° F. | 1200° F. |
|---|---|---|---|
| Per cent $Fe_2O_3$ of calcined clay weight basis | 0.10 | 0.45 | 0.90 |

*Example II*

The raw clay employed in this example was a kaolin from Putnam County, Florida, known commercially as "Edgar E. P. K.," having the following analysis on an ignited basis:

| | Parts by weight |
|---|---|
| $SiO_2$ | 53.0 |
| $Al_2O_3$ | 44.2 |
| $Fe_2O_3$ | 1.14 |
| CaO | 0.50 |
| MgO | 0.26 |
| $TiO_2$ | 0.40 |
| Alk. metal (as oxides) | 0.59 |

Pellets were prepared from the Edgar clay in the same manner as in Ia above and the pellets similarly treated with $CS_2$ in nitrogen at 1400° F. for 2 hours, acid leached and finished as in Ib and Ic.

The pellets on analysis were found to contain 0.28% $Fe_2O_3$. The same clay pellets similarly treated with $CS_2$ at 1200° F. for two hours and leached still contained 1.09% $Fe_2O_3$.

*Example III*

A commercial acid-activated sub-bentonite clay was pelleted as in the preceding example and likewise subjected to treatment with $CS_2$ in excess of the calculated amount necessary to react with the iron content, acid-leached and finished as above described in Example I.

The clay pellets which had originally an iron content of about 2% $Fe_2O_3$, after treatment at 1300° F. with $CS_2$ showed the presence of 0.32% $Fe_2O_3$, while after similar treatment at 1200° F., there still remained 1.15% $Fe_2O_3$.

*Example IV*

Another sample of a commercial acid-activated clay which had been washed free of sulfate ($SO_4$=.15) was likewise pelleted and the pellets similarly treated with $CS_2$ at 1400° F. acid-leached and finished as before.

The pellets which had an original iron content of 2.4% after $CS_2$ treatment and leaching as described showed 0.20% $Fe_2O_3$.

Iron analysis of the various treated pellets of the above examples are compared in the following table:

| Pelleted clay | $CS_2$ treated at °F. | Per cent $Fe_2O_3$ |
|---|---|---|
| "Eccles" kaolin | 1,400 | 0.10 |
| | 1,300 | 0.45 |
| | 1,200 | 0.90 |
| "Edgar EPK" | 1,400 | 0.28 |
| | 1,200 | 1.09 |
| Commercial acid-activated clay | 1,400 | 0.20 |
| | 1,300 | 0.32 |
| | 1,200 | 1.15 |

In cracking and reforming of ordinary petroleum stocks, catalysts prepared from commercial acid-activated clays have given excellent performance and in some instances are preferred to the best available commercial synthetic catalysts. These commercial clay catalysts, however, have the disadvantage of rapidly declining in activity when contacted with certain corrosive charge stocks, such as those of high sulfur content. The modified clay catalysts prepared in accordance with the invention, whose properties differ in several respects including the greatly reduced iron content mentioned above, are advantageous for use in treating such stocks.

In many instances, particularly with kaolin clays, the general catalytic activity and efficiency of the clay is also materially improved by the described high temperature treatment with $CS_2$ and leaching, as is evident from the following comparison of samples of pelleted clays finally calcined in air at 1050° F. for 2 hours:

| Clay | $CS_2$ treat. temp., °F. | CAT-A Yields | | | |
|---|---|---|---|---|---|
| | | Gasoline, Vol. percent | Coke, Wt. percent | Gas, Wt. percent | Gas, Gravity |
| "Eccles" kaolin | 1,400 | 34.3 | 3.0 | 8.7 | 1.49 |
| | 1,200 | 28.9 | 3.0 | 9.0 | 1.26 |
| "Edgar EPK" | 1,400 | 33.5 | 2.9 | 8.2 | 1.42 |
| | 1,200 | 29.5 | 2.3 | 7.4 | 1.34 |

Surprisingly, in many instances a clay having an activity so low as to be valueless for commercial use can be brought in accordance with the invention to acceptably good activity level, as is typified by the above "Edgar EPK" which has an activity when not so treated of only about 11% gasoline being pelleted and calcined in air under the same conditions as the catalyst of the above table.

It will be noted that in accordance with the preferred embodiment of the invention as set out in the above specific examples, a heated, inert, non-oxidizing gas, such as nitrogen is employed as a diluent and carrier for the active carbon disulfide vapor. The described feature of using an inert gas or vapor to preheat the clay and/or as a carrier for the active treating gas or vapor is not limited to processes in which the active treating gas comprises carbon disulfide, and may be employed with other active gases or vapors, such as hydrogen sulfide gas or vaporized sulfur, as the reagents for reaction with the iron components of the clay.

Obviously many modifications and variations of the invention as hereinbefore set forth may be made without departing from the spirit and scope thereof and therefore only such limitations should be imposed as are indicated in the appended claims.

Hydrocarbon conversion processes employing catalytic contact masses that may be prepared in accordance with the present invention are particularly claimed in our copending applications Serial Nos. 644,425 and 644,426 filed January 30, 1946.

We claim as our invention:

1. The method of preparing adsorptive contact masses which comprises the steps of subjecting clay to the action of carbon disulfide at a temperature of at least 1300° F. but below the temperature of substantial incipient fusion of the clay, and leaching the thus sulfided clay with an acid.

2. The process in accordance with claim 1 in which the clay is a sub-bentonite.

3. The process in accordance with claim 1 in which the clay is an acid-activated sub-bentonite.

4. The process in accordance with claim 1 in which the clay is of the kaolin type.

5. The method of preparing catalytic contact masses which comprises subjecting a montmorillonite clay to carbon disulfide-containing vapor at a temperature in a range of 1300–1500° F. and leaching the sulfided clay with diluted mineral acid.

6. The method of preparing catalytic contact masses of low iron content which comprises forming a clay material containing iron compounds into pellets, subjecting the pellets to a heated gaseous atmosphere comprising carbon disulfide vapor, at a temperature of at least 1300° F. but below the temperature of substantial incipient fusion of the clay, to form sulfides with iron compounds in the clay and removing the formed sulfides of iron.

7. The method of preparing a contact mass of low iron content from a clay material containing iron to an extent of more than 1% $Fe_2O_3$ which comprises, subjecting the said clay to mild acid treatment, to remove at least a portion of the available iron compounds, converting iron compounds remaining in the residue to sulfides by contact with a gas containing vaporized carbon disulfide at a temperature of at least 1300° F. but below the temperature of substantial incipient fusion of the clay, and removing the formed iron sulfides by acid leaching.

8. The method of activating kaolin which comprises treating the same with carbon disulfide at a temperature of approximately 1400° F., acid leaching the sulfided product, and calcining the residue.

9. The method of preparing a clay catalyst of low iron content which comprises the steps of acid treating an iron-containing clay to an extent at least sufficient to improve the porosity thereof and insufficient to reduce the alumina content thereof to below 10% by weight of the clay, washing and drying the acid-treated clay, subjecting the dried clay to contact with carbon disulfide in stoichiometric excess of the iron content of the clay and at a temperature of at least 1300° F. but below that causing substantial incipient fusion of the clay, to transform the major portion of the iron compounds present to iron sulfides, leaching the sulfided clay with dilute mineral acid, then washing, drying, and calcining the purified clay product.

HUBERT A. SHABAKER.
GEORGE ALEXANDER MILLS.
RUTH C. DENISON.

REFERENCES CITED

The following references are of record in the file of this patent:

UNITED STATES PATENTS

| Number | Name | Date |
|---|---|---|
| 2,322,674 | Thomas | June 22, 1943 |
| 2,388,302 | Weyl | Nov. 6, 1945 |